US011481686B1

(12) United States Patent
Yim et al.

(10) Patent No.: US 11,481,686 B1
(45) Date of Patent: Oct. 25, 2022

(54) SELECTIVELY RENDERING A KEYBOARD INTERFACE IN RESPONSE TO AN ASSISTANT INVOCATION IN CERTAIN CIRCUMSTANCES

(71) Applicant: GOOGLE LLC, Mountain View, CA (US)

(72) Inventors: Keun Soo Yim, San Jose, CA (US); Zhitu Chen, Mountain View, CA (US); Brendan G. Lim, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/319,378

(22) Filed: May 13, 2021

(51) Int. Cl.
*G06N 20/00* (2019.01)
*G06F 3/16* (2006.01)
*G06F 3/04886* (2022.01)

(52) U.S. Cl.
CPC ......... *G06N 20/00* (2019.01); *G06F 3/04886* (2013.01); *G06F 3/167* (2013.01)

(58) Field of Classification Search
None
See application file for complete search history.

(56) References Cited

U.S. PATENT DOCUMENTS

| 2011/0061017 | A1* | 3/2011 | Ullrich | G06F 3/0237 |
| | | | | 715/702 |
| 2014/0222436 | A1* | 8/2014 | Binder | G10L 15/26 |
| | | | | 704/275 |
| 2016/0080296 | A1* | 3/2016 | Lewis | G06F 16/70 |
| | | | | 715/752 |
| 2017/0264566 | A1* | 9/2017 | Namboodiri | G06F 9/5044 |
| 2018/0288380 | A1* | 10/2018 | Raffa | G10L 25/78 |
| 2018/0295071 | A1* | 10/2018 | Jain | G06F 16/3329 |
| 2018/0314362 | A1* | 11/2018 | Kim | G06F 3/0488 |
| 2019/0095050 | A1 | 3/2019 | Gruber et al. | |

(Continued)

FOREIGN PATENT DOCUMENTS

EP 3005668 4/2016

OTHER PUBLICATIONS

Virtual Assistant With Tappable User Interface (Year: 2020).*

(Continued)

*Primary Examiner* — Mandrita Brahmachari
(74) *Attorney, Agent, or Firm* — Middleton Reutlinger

(57) ABSTRACT

Implementations set forth herein relate to an automated assistant that can adapt to circumstances in which a user may invoke an automated assistant with an intention of interacting with the automated assistant via a non-default interface. For example, in some instances, a user may invoke an automated assistant by selecting a selectable GUI element. In response, the automated assistant can determine that, in the current context, spoken utterances may not be suitable for providing to the automated assistant. Based on this determination, the automated assistant can cause a keyboard interface to be rendered and/or initialized for receiving typed inputs from the user. Should the user subsequently change contexts, the automated assistant can determine that voice input is now suitable for user input and initialize an audio interface in response to the user providing an invocation input in the subsequent context.

14 Claims, 8 Drawing Sheets

(56) References Cited

U.S. PATENT DOCUMENTS

| | | |
|---|---|---|
| 2019/0354252 A1 | 11/2019 | Badr |
| 2020/0042335 A1* | 2/2020 | Brown et al. |
| 2020/0073479 A1* | 3/2020 | Ueno .................... G06F 3/0482 |
| 2021/0037064 A1* | 2/2021 | Casey ................. H04L 65/1069 |
| 2021/0055911 A1 | 2/2021 | Tracz et al. |

OTHER PUBLICATIONS

Sarker et al., "Effectiveness analysis of machine learning classification models for predicting personalized context-aware smartphone usage" Journal of Big Data (2019) 6:57 https://doi.org/10.1186/s40537-019-0219-y. 28 pages.

* cited by examiner

SELECTIVELY RENDERING A KEYBOARD INTERFACE IN RESPONSE TO AN ASSISTANT INVOCATION IN CERTAIN CIRCUMSTANCES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

An automated assistant may be invoked through different modalities, such as an audio interface, touch interface, and/or camera interface. Each of these modalities may be more suitable depending on a context in which the user is attempting to interact with the automated assistant. However, in order to select a particular modality, the user may need to provide one or more inputs to the automated assistant to ensure that the automated assistant is initialized for receiving further inputs via a desired modality. For example, pressing a "home" button or squeezing the sides of a mobile device are invocation inputs that can be used to initialize some automated assistants for receiving spoken utterances. Regardless of the input modality that the user intends to employ to interact with the automated assistant, the automated assistant may indiscriminately cause a default interface to be initialized for receiving user input.

In some contexts, such as when the user is in a noisy environment, the user may or may not wish to further engage with the automated assistant using spoken utterances. For instance, a user that taps their "home" button to initialize their automated assistant may be presented with a microphone icon, indicating that the automated assistant has been initialized for receiving audible inputs from the user. In order to further interact with the automated assistant via another interface (e.g., keyboard interface), the user may need to provide additional input to a computing device to reach the other interface. Such additional inputs may be redundant, at least in view of the automated assistant having already been initialized. Moreover, the additional inputs may indirectly waste computational resources that are consumed when an interface (e.g., a microphone) is initialized but then is not used by the user.

SUMMARY

Implementations set forth herein relate to an automated assistant that can pro-actively render a predicted interface for a user to communicate with the automated assistant. Some of those implementations render the predicted interface when the user has invoked the automated assistant with input(s) that are agnostic as to which of multiple candidate interfaces should be rendered (exclusively or in combination with other candidate interface(s)) or with input(s) that specify a different interface that is different from the predicted interface that is rendered. In many implementations, an automated assistant can be invoked at a mobile computing device by tapping a "home" button, an application icon, other button for an amount of time, squeezing the mobile device, speaking an invocation phrase (e.g., "Ok, Assistant"), gazing at the mobile computing device for a threshold duration of time, and/or providing other automated assistant invocation input(s). In response to invocation, the automated assistant can typically default to initializing an audio interface for receiving spoken inputs from the user, regardless of whether the user plans to interact with the automated assistant using spoken input. As a result, the user may be required to provide additional input(s) to the automated assistant and/or computing device in order to indicate to the automated assistant that the user would like to interact with the automated assistant via another interface. For example, the user can be required to select a keyboard icon that is rendered along with the audio interface but without rendering of a keyboard interface and, in response to the selection of the keyboard icon, the keyboard interface can then be rendered (e.g., and the audio interface no longer rendered). Although this enables the user to select the alternate interface, this can ultimately extend an amount of time that the interaction between the user and the automated assistant consumes, and also waste computational resources when processing the user inputs that direct the automated assistant to another interface.

In order to eliminate the need for the user to specify certain interfaces, the automated assistant can process certain data in order to identify an interface that the user is predicted to be soliciting as an input modality for a forthcoming interaction. For example, when the user invokes the automated assistant using a tap gesture (e.g., a direct physical input using an extremity of a user) at an interface (e.g., a button) of a computing device, the automated assistant can determine that a context of the user is not suitable for spoken input or other indirect physical input (i.e., a non-touch input provided by a user at a non-zero distance from a computing device) and/or is more suitable for direct typed input (e.g., via a virtual keyboard). Based on this determination, the automated assistant can cause a keyboard graphical user interface (GUI) to be rendered at a display interface of the computing device. For example, the keyboard GUI can be rendered instead of or along with an audio/spoken interface whereas, absent determining that the context is not suitable for spoken input, the audio/spoken interface can be rendered without rendering the keyboard GUI (e.g., instead rendering a keyboard icon that is selectable to then cause the keyboard GUI to be rendered). When the keyboard GUI is rendered in response to the invocation, the user can then begin immediately interacting with the automated assistant by providing a typed input to the automated assistant. In this way, significant time and resources can be preserved by eliminating a need for the user to direct the automated assistant to the keyboard GUI through provision of additional input(s). For example, a lesser quantity of user inputs can be provided during the interaction between the user and the automated assistant (e.g., at least by eliminating the need of the user to provide additional input(s) to direct the automated assistant to the keyboard GUI) and the interaction between the user and the automated assistant can conclude more quickly.

Moreover, by only selectively causing the keyboard GUI to be initially rendered in response to an automated assistant invocation and when it is determined that the context of the user is not suitable for indirect input and/or is more suitable for direct typed output, initial rendering of the keyboard GUI can be prevented when it is unlikely to be utilized and/or when indirect input is likely to be utilized. As described herein, in many implementations determining whether to initially render the keyboard GUI can be based on a current context and based on previous interactions between the user and the automated assistant and/or previous interactions between one or more other users and one or more other computing devices. For example, a machine learning model can be trained based on training examples that each include a historical past current context as training instance input and an indication of which interface was utilized, by a corresponding user, when the automated assistant was invoked in the historical past current context. For instance, assume a user invoked the automated assistant in a given context and only the audio interface was rendered initially in response to the invocation, but the user then selected a keyboard icon to cause the keyboard GUI to be rendered and/or used the keyboard GUI once rendered. In such an instance, the training example can include input that is based on the given context and can include output that indicates the keyboard GUI was utilized. In these and other manners, determining whether to selectively render the keyboard GUI based on current context and previous interactions can ensure that, at least in aggregate, rendering the keyboard GUI will reduce a quantity of user inputs during interactions with the automated assistant and/or enable the interactions to conclude more quickly. Put another way, even though predictions of whether to render the keyboard GUI can turn out to be incorrect in some situations, the predictions, in aggregate (e.g., multiple predictions for a given user or a collection of users), will be correct more often than not and result in various efficiencies.

As one particular example, assume a user is using a computing device that is rendering a website and/or application at a display interface of the computing device. When the user invokes the automated assistant by selecting an interface element of the computing device, the automated assistant can determine, based on a GUI and/or an application being rendered at the computing device, whether or not to initialize an audio interface of the computing device. For instance, a current state of the application can be one in which the user has not previously, frequently (e.g., less than or equal to a threshold frequency) engaged with a keyboard interface of the computing device concurrent to the application being in the state. As a result, when the user invokes the automated assistant while the application is in the current state, the keyboard may not be presented to the user for providing input to the automated assistant. Alternatively, or additionally, the application (e.g., a website and/or local application) can be exhibiting another state in which the user has occasionally (e.g., more than the threshold frequency) engaged with the keyboard interface of the computing device concurrent to the application being in the other state. As a result, when the user invokes the automated assistant while the application is in the other state, the keyboard is presented to the user for providing input to the automated assistant. Alternatively, or additionally, an audio interface can be initialized for providing spoken input to the automated assistant while the application is exhibiting the other state.

In some implementations, a particular state of an application and/or website can be one in which the user and/or a collection of users (optionally including the user) may or may not have shown an inclination for employing a keyboard interface. For example, interaction data that characterizes prior interactions between the user and one or more applications can indicate that a frequency of usage of a keyboard when the application is in the particular state satisfies an additional threshold. As a result, when the application is exhibiting the particular state, the automated assistant can cause a shortcut or other selectable element to be rendered at an interface of the application. The other selectable element can be, for example, a button that causes the keyboard interface to appear when the user selects the button (e.g., swipes up at the button to reveal the keyboard). In this way, when the additional threshold is determined to be satisfied based on data associated with a current state of an application, and the user invokes the automated assistant, an audio interface can be initialized and a keyboard indication (e.g., a button, flashing, highlighting, link, etc.) can be rendered at the computing device.

In some implementations, one or more different GUI elements can be rendered at a display interface of a computing device based on a context in which the user has invoked their automated assistant. For example, a partial keyboard and/or a selectable suggestion can be rendered at the display interface based on a context in which the user invoked the automated assistant. When the user selects the selectable suggestion and/or partial keyboard, a portion of an input can be submitted to an input field of an automated assistant application and/or a keyboard interface can be rendered at the computing device. In some implementations, the selectable suggestion can be a word and/or phrase that the user is predicted to provide as an input to the automated assistant after invoking the automated assistant.

For example, when the user invokes the automated assistant by tapping a "home" button, the automated assistant can identify an input modality that the user is likely to prefer for interacting with the automated assistant, as well as one or more predictions for natural language inputs that the user may provide to the automated assistant. The automated assistant can then cause a selectable element associated with the input modality to be rendered at the computing device, and also cause another selectable element to be rendered for identifying the predicted natural language input that the user may provide (e.g., "Call . . . " or "Send a message to . . . "). In this way, in circumstances where the user may not prefer to provide a default input type (e.g. spoken input) to the automated assistant, the automated assistant can provide the user with a quick entry-point for interacting with the automated assistant via a separate modality that is more suitable under the circumstances.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations can include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
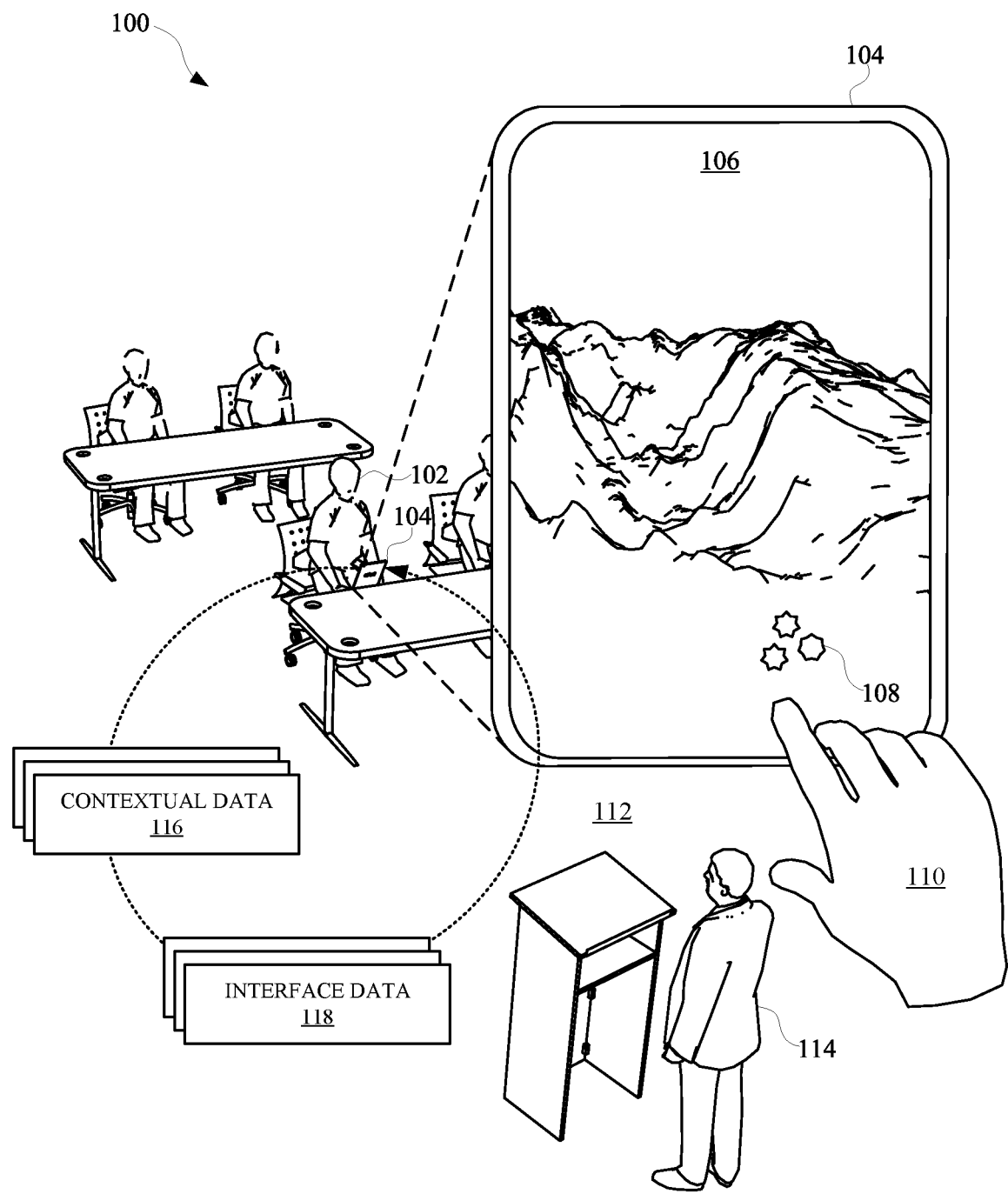
FIG. 1A and FIG. 1B illustrate views of a user invoking an automated assistant that can select an initial interface for interacting with the automated assistant based on a context of the user.
Figure 1B:
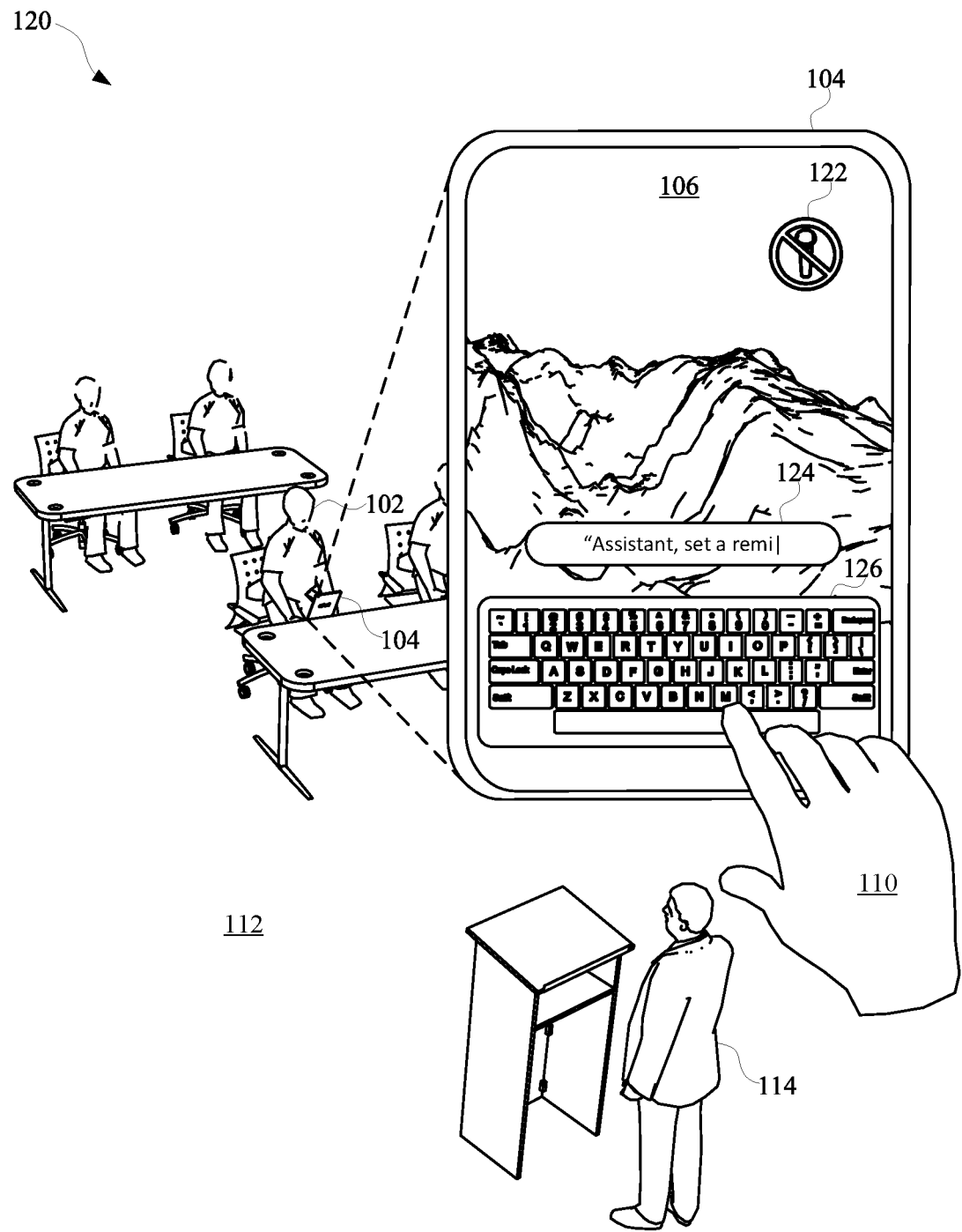

FIG. 1A and FIG. 1B illustrate a view 100 and a view 120 of a user 102 invoking an automated assistant that can select an initial interface for interacting with the automated assistant based on a context of the user 102. For example, the user 102 can be interacting with a computing device 104 that can provide access to an automated assistant, which the user 102 can provide inputs to via multiple different interfaces of the computing device 104. However, because of a context 112 of the user 102, the user 102 may not be willing to provide a spoken input to an audio interface of the computing device 104. For instance, a spoken utterance from the user 102 may interrupt a lecturer 114 that is presenting to an audience in the context 112. Regardless, the user 102 can rely on the automated assistant to select a suitable interface for interacting with the automated assistant in the given context 112 (e.g., a location of the user 102, an application being rendered in a foreground of a display interface 106 of the computing device 104, a state of the application, etc.).

For example, in order to invoke the automated assistant, the user 102 can tap, with their hand 110, a selectable element 108 that is rendered at a display interface 106 of the computing device 104. In response to selecting the selectable element 108, the automated assistant can identify a particular interface to initialize for the user 102 to interact with the automated assistant. In some implementations, the automated assistant can process data (e.g., contextual data 116) from one or more sources in order to generate interface data 118 for identifying a suitable interface for the user 102 to interact with the automated assistant. The automated assistant can process this data before the user 102 invokes the automated assistant and/or in response to the user 102 invoking the automated assistant. In some implementations, the data can characterize a location of the user 102, an amount of noise in the context 112, image data captured by one or more cameras and communication with the computing device 104, features of a foreground application, state(s) of an application(s), audio data captured by one or more microphones in communication with the computing device 104, and/or interaction data that is based on interactions between one or more users and one or more computing devices (e.g., a frequency of usage of a particular assistant interface).

For example, one or more features of a context of the user can be processed to generate a metric that can be compared to one or more thresholds to identify one or more interfaces to initialize for the user to interact with the automated assistant. For instance, a metric and/or embedding can be generated based on the user accessing a particular type of application (e.g., an email application) in a particular location (e.g., in a library). This metric and/or embedding can be compared to a threshold and/or other embedding in order to determine whether to cause a keyboard interface to be fully rendered, partially rendered, or not rendered at the interface in response to a user invoking the automated assistant. For example, based on processing the metric, the automated assistant can cause the keyboard interface to be fully rendered at the display interface of the computing device in order to receive assistant inputs via the automated assistant. Alternatively, or additionally, another metric can be generated, with prior permission from the user, based on the user speaking to someone in close proximity (e.g., less than 10 feet away). Based a relationship between the other metric and a threshold metric, the automated assistant can determine that the user may prefer to speak to their automated assistant when they are already speaking out loud to someone in close proximity. As a result, when the user invokes the automated assistant, the automated assistant can initialize an audio interface of the computing device without causing a keyboard interface and/or keyboard suggestion to be rendered at the computing device.

For example, in some implementations, data can be processed in order to generate a metric that is based on a suitability of a particular interface for interacting with the automated assistant in a particular context. When the metric satisfies a threshold, the automated assistant can respond to an invocation input by initializing a first input modality. When the metric does not satisfy the threshold, the automated assistant can respond to an invocation input by initializing a second input modality. Alternatively, or additionally, when the metric satisfies or does not satisfy an additional threshold, the automated assistant can initialize one or more input modalities and bypass initializing one or more other input modalities.

In some implementations, the metric can be generated using a statistical analysis of when certain interfaces are employed by a user at different times and/or in different contexts. Alternatively, or additionally, the metric can be generated using one or more trained machine learning models that can be used to process contextual data in order to provide an indication of whether a keyboard interface and/or audio interface should be initialized. In some implementations, a metric can be, but is not limited to, a value between 0 and 1 such that: (1) when the metric is 0, a keyboard can be rendered, (2) when the value is 1, a keyboard may not be rendered, and (3) when the value is between 0 and 1, a keyboard shortcut and/or partial keyboard can be rendered. Alternatively, or additionally, when the value is between 0 and 0.5, a keyboard shortcut can be rendered and/or caused to be emphasized at a display interface, and when the value is between 0.5 and 1, a partial keyboard (e.g., a keyboard preview and/or snippet) and/or a natural language content suggestion (e.g., a tap-able word or command phrase) can be rendered at the display interface.

In some implementations, training data can be generated for training a machine learning model during interactions between a user and an automated assistant, and/or the user and an application. For example, certain contextual data can be used to generate training data by classifying certain contextual signals as being, or not being, associated with keyboard usage. In this way, as the user continues to interact with their automated assistant in new contexts (e.g., while viewing a newly installed application), trained machine learning models can be further trained in order to accurately initialize certain interfaces in such contexts.

In some instances, and as illustrated in view 120 of FIG. 1B, in response to the user tapping the selectable element 108, the automated assistant can cause a keyboard interface

126 to be rendered at a computing device 104. In other words, because the automated assistant has determined that the context 112 is not suitable for spoken input, the automated assistant can cause the keyboard interface 126 to be rendered for the user 102. Alternatively, or additionally, a GUI element 122 can be rendered to indicate that the audio interface of the computing device 104 has not been initialized in response to the invocation input. Alternatively, or additionally, the automated assistant can cause an input field 124 to be rendered at the display interface 106 in lieu of initializing the audio interface for receiving spoken input from the user 102.

Figure 2A:
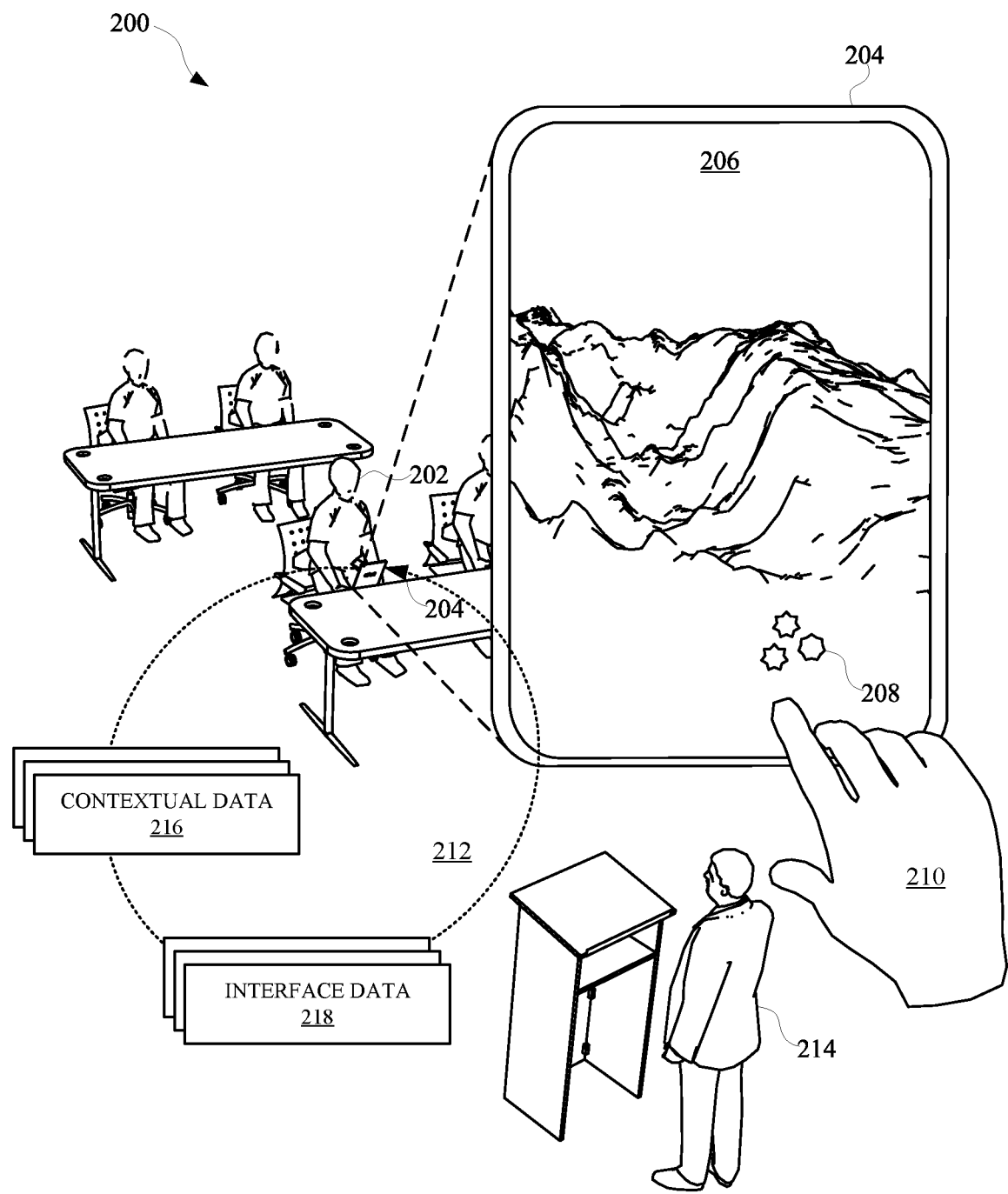
FIG. 2A, FIG. 2B, and FIG. 2C illustrate views of a user interacting with an automated assistant that can predict and select an interface that a user will employ in a context in which the user invoked the automated assistant.
Figure 2B:
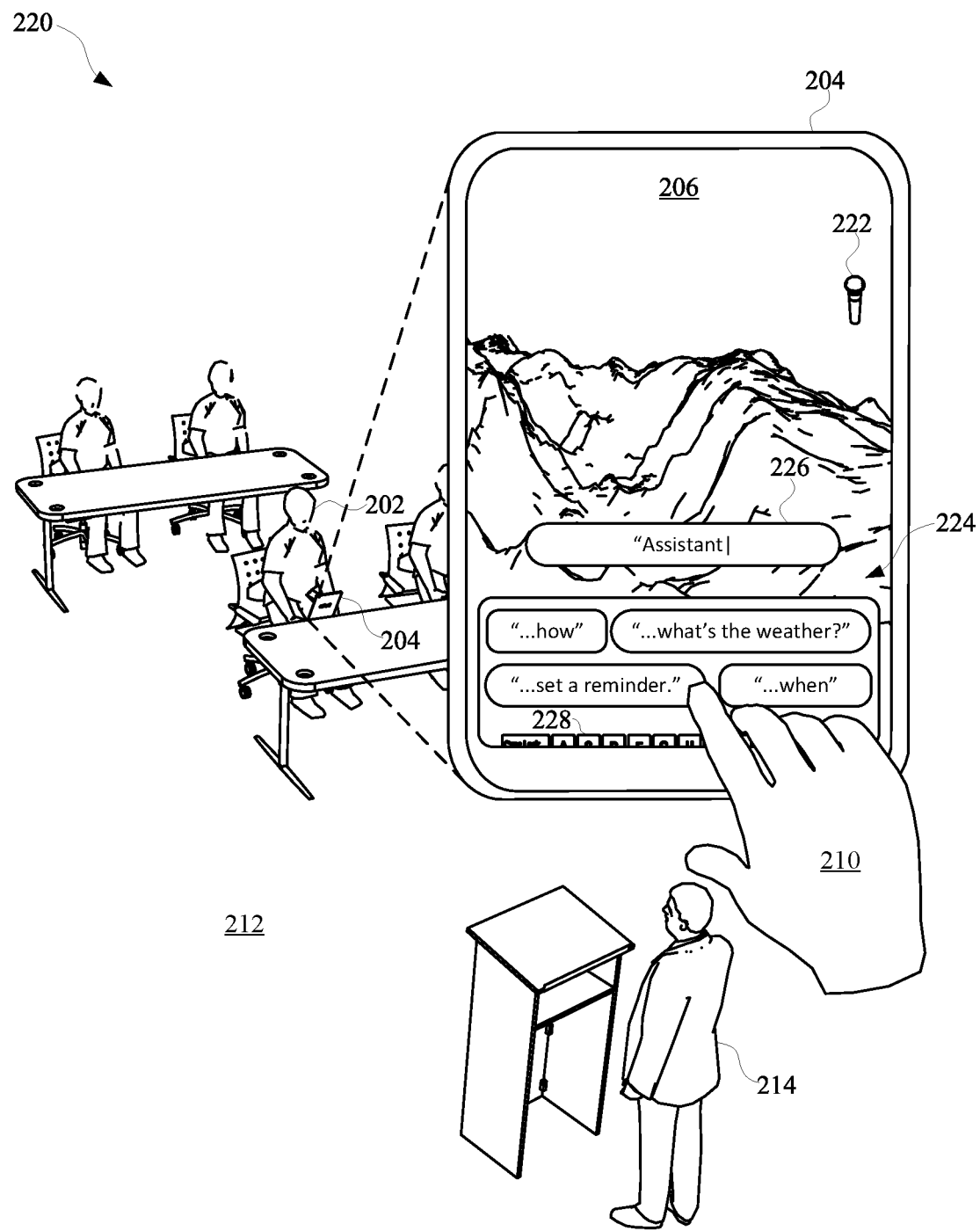
Figure 2C:
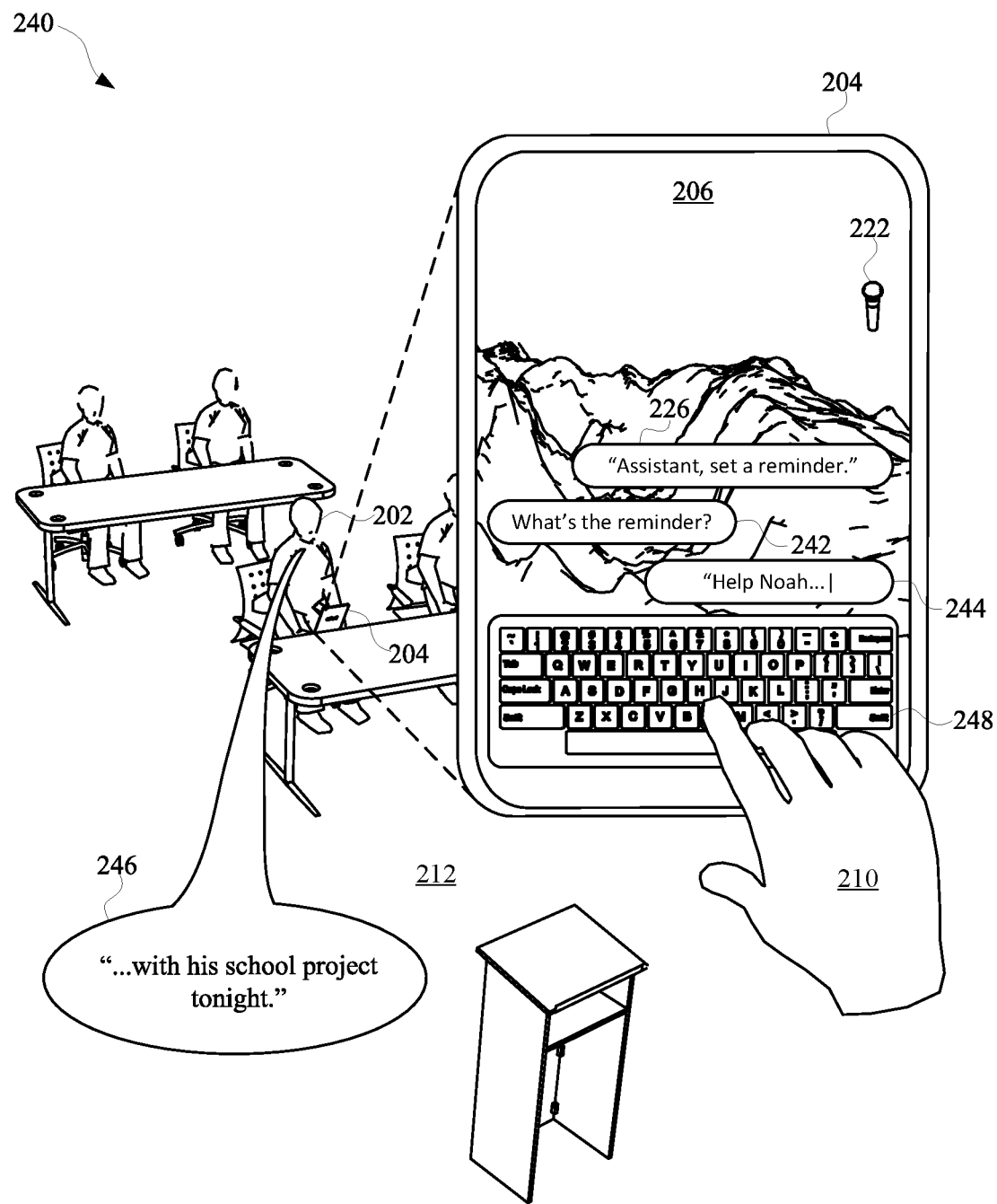

FIG. 2A, FIG. 2B, and FIG. 2C illustrate a view 200, a view 220, and a view 240 of a user 202 interacting with an automated assistant that can predict and select an interface that a user will employ in a context 212 in which the user 202 invoked the automated assistant. For example, when the user 202 is in a context 212 in which the user 202 may not desire to interact with the automated assistant via spoken input, the user 202 may nonetheless invoke the automated assistant by using their hand 210 to select a selectable element 208. In response to selecting the selectable element 208, and/or before the automated assistant is invoked, the automated assistant can process contextual data 216 characterizing the context 212 in which the user 202 invoked the automated assistant. Based on this processing, the automated assistant can generate interface data 218, which can identify an interface that the user 202 is predicted to employ for interacting with the automated assistant in the given context 212.

For example, instead of defaulting to initializing an audio interface in response to being invoked, the automated assistant can determine that one or more other interfaces may be suitable for interacting with the automated assistant. In some implementations, the interface data 218 can indicate that a keyboard interface 224 is predicted to be employed by the user 202 in the given context 212, but that the audio interface may also be suitable. Based on this indication, the automated assistant can initialize a keyboard interface 224, with selectable suggestions, and an audio interface for receiving spoken utterances from the user 202. Alternatively, or additionally, the automated assistant can cause an input field 226 to be rendered with natural language content incorporated into the input field 226.

In some implementations, based on the context 212, the automated assistant can cause the audio interface of the computing device 204 to be initialized simultaneous to providing a selectable element 228 for invoking the keyboard interface. For example, the automated assistant can cause a GUI element 222 to be rendered at the display interface 206 to indicate that the audio interface has been initialized in response to the user 202 invoking the automated assistant. Additionally, the selectable element 228 can be rendered, with or without other selectable suggestions (e.g., " . . . how," " . . . set a reminder," etc.), to put the user 202 on notice that they may access a keyboard by selecting the selectable element 228.

As illustrated in FIG. 2B, the user 202 can select a selectable suggestion (e.g., " . . . set a reminder.") with their hand 210, which can cause content to be incorporated into the input field 226 for creating a command to be submitted to the automated assistant. In response to receiving the command, the automated assistant can provide a response 242 to the command via the same interface or another interface that has been indicated by the automated assistant as being available. For example, as the user 202 is typing an additional input 244 to the automated assistant, an instructor 214 may leave the context 212 in which the user 202 is interacting with the automated assistant. Based on this change in context 212, the user 202 can choose to provide a spoken utterance 246 such as, " . . . with his school project tonight," instead of continuing to type an input via a keyboard 248, as illustrated in view 240 of FIG. 2C. In this way, although the automated assistant correctly identified an interface that the user 202 would employ after invoking the automated assistant, the automated assistant also identified another interface that the user 202 may employ as the context 212 changes. In this way, one or more different interfaces can be initialized by the automated assistant in response to an invocation input and according to one or more features of a context in which the automated assistant was invoked.

Figure 3:
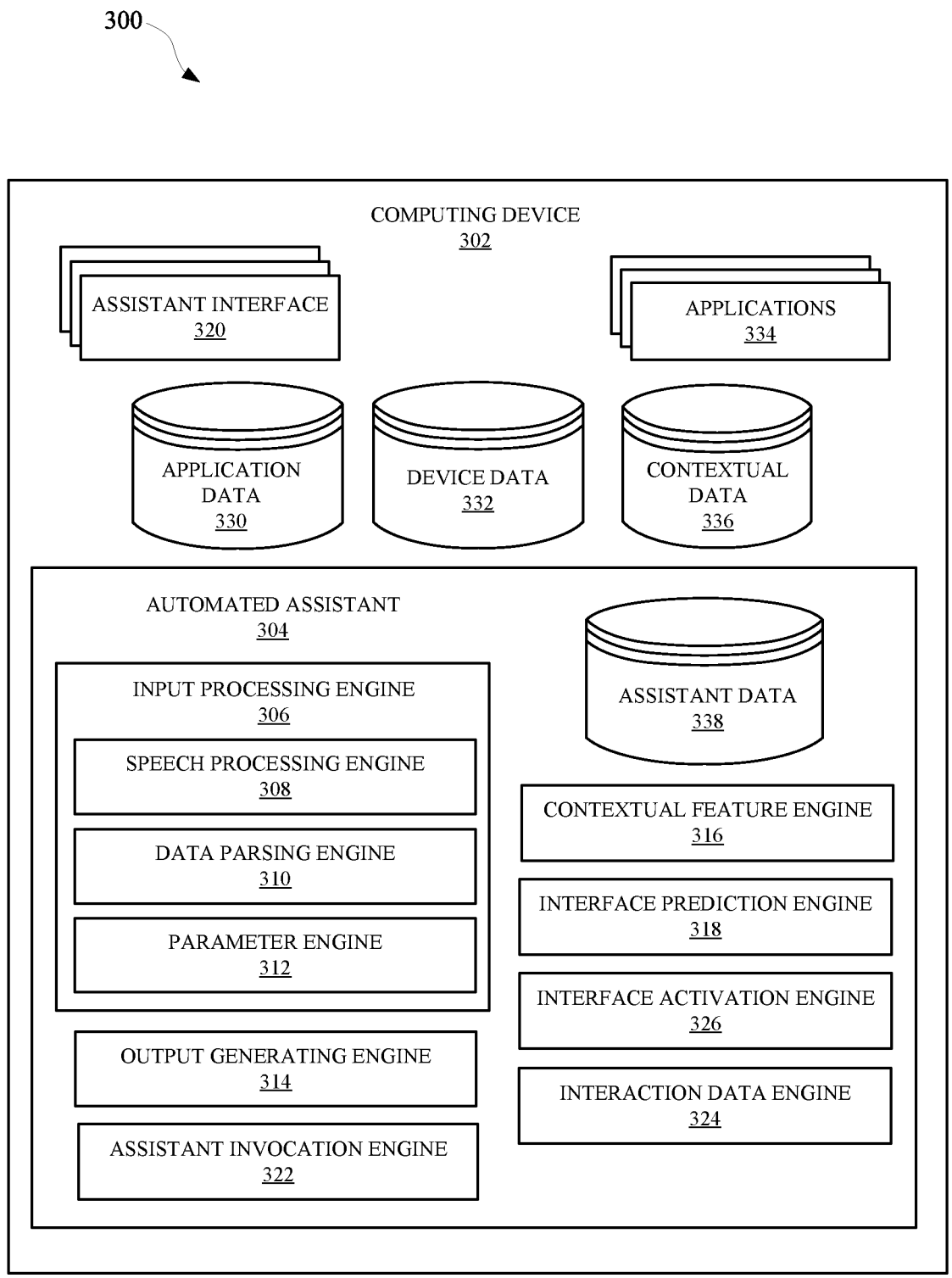
FIG. 3 illustrates a system for providing an automated assistant that can predict when a user will prefer to use a non-audio interface for interacting with the automated assistant after the user has invoked the automated assistant.

FIG. 3 illustrates a system 300 for providing an automated assistant 304 that can predict when a user will prefer to use a non-audio interface for interacting with the automated assistant 304 after the user has invoked the automated assistant 304. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models.

The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304.

For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. For example, a user that typically invokes their automated assistant immediately upon entering their vehicle each morning can cause training data to be generated for training the automated assistant to initialize when the user subsequently enters their vehicle. In some implementations, assistant invocations based on context and/or environment can include further determinations of whether and/or how to render a keyboard for providing assistant input to the automated assistant. For example, when the automated assistant is initialized based on a user entering their vehicle, the automated assistant may not cause a keyboard interface to be rendered. However, when the automated assistant is initialized based on the user entering the library and accessing a search engine website, the automated assistant may cause a keyboard shortcut (e.g., a selectable GUI element that, when swiped, causes a full keyboard initialized) to be rendered.

In some implementations, the system 300 can include a contextual feature engine 316, which can process various data in order to identify one or more features of a context in which a user has invoked the automated assistant 304. For example, the contextual feature engine 316 can process application data 330, device data 332, and/or contextual data 336 in order to identify one or more features of a context in which the user has invoked, or may subsequently invoke, the automated assistant 304. In some implementations, data processed by the contextual feature engine 316 can be used to generate an embedding that can be mapped to a latent space. When an embedding is generated for a particular context, Euclidian distances in latent space can be identified. The Euclidian distances can correspond to a distance in latent space between the embedding and other embeddings corresponding to assistant interfaces. When a distance satisfies one or more thresholds and when a user invokes the automated assistant 304, one or more interfaces can be initialized or not initialized based on the one or more thresholds being satisfied.

In some implementations, the system 300 can include an interface prediction engine 318, which can identify one or more interfaces that a user may prefer to use for interacting with the automated assistant 304 in a given context. The interface prediction engine 318 can process data generated by the contextual feature engine 316 in order to predict a particular interface that may be more suitable for assistant interactions in a given context. In some implementations, the interface prediction engine 318 can employ one or more trained machine learning models in order to process data from the contextual feature engine 316 and/or data that is based on interactions between one or more other users (with prior permission from those other users) and their respective automated assistants. In this way, instances when another user has invoked their automated assistant but selected a non-default interface (e.g., an interface that is less frequently activated when the other user invokes their automated assistant) can be used as training instances for further training the one or more trained machine learning models.

For example, in a particular context, the user can invoke their automated assistant and an audio interface can be initialized without a keyboard interface being rendered for the user. However, over time the user may start to access the keyboard interface in the particular context, which can cause additional training data to be generated for updating one or more models employed by the interface prediction engine 318. As a result, when the user is in the particular context, the automated assistant can be initialized with the keyboard interface, based on the feedback generated as the user changes their habits when accessing the automated assistant in certain contexts. In some implementations, a weight assigned to one or more contextual features can be adjusted based on such instances, thereby resulting in changes to location(s) of embedding(s) in latent space. This can allow more accurate interface predictions to be made by the interface prediction engine 318, which can result in condensed assistant interactions and/or fewer inputs to be processed by the automated assistant and/or computing device 302.

In some implementations, the system 300 can include an interface activation engine 326 that can control whether one or more assistant interfaces 320 of the computing device 302 or another computing device are initialized in response to a user invoking their automated assistant. A determination of whether the interface activation engine 326 initializes an interface can be based on processing performed by the contextual feature engine 316 and/or the interface prediction engine 318. In some implementations, the interface activation engine 326 can generate a "hybrid" interface for one or more interfaces based on the context of the user. For example, when one or more thresholds are determined to be satisfied for providing a "hybrid" interface of a keyboard interface, the interface activation engine 326 can generate data that can be used for rendering a "hybrid" keyboard interface. In some instances, the data can characterize one or more selectable suggestions for portions of a command to be provided to the automated assistant (e.g., as illustrated in FIG. 2B). Alternatively, or additionally, the interface activation engine 326 can generate data that can be used to indicate to the user that one or more interfaces have, or have not, been initialized. For example, a crossed-out microphone (e.g., as illustrated in FIG. 1B) can be generated and/or selected by the automated assistant in order to indicate to the user that an audio interface has not been initialized in response to a most recent assistant invocation input.

In some implementations, the system 300 can include an interaction data engine 324, which can generate interaction data that is based on interactions (e.g., indirect and/or direct) between one or more users and an automated assistant, and/or one or more users and one or more devices. The interaction data can then be processed by one or more engines of the system 300 in order to predict an interface and/or type of input (e.g., physical motion at a non-zero distance from an interface) that a user may prefer to employ to interact with an automated assistant in a given context. Alternatively, or additionally, the interaction data can be used, with prior permission from a user, for training one or more trained machine learning models that can be used when subsequently processing context-related data. For example, the system 300 can determine that an interface prediction is wrong based on a user switching from a predicted interface to a non-predicted interface. This can occur when, for instance, the use presses a button to invoke the automated assistant 304 in a particular context (e.g., at their office), is provided with a full rendering of a keyboard interface, but, instead, uses an audio interface to provide input to the automated assistant. This instance can be used by the interaction data engine 324 to generate negative feedback data for further training one or more trained machine learning models so that the automated assistant 304 is less likely to render the full keyboard interface in that particular context. In some instances, the user may employ the predicted interface in another context, and—in these instances, positive feedback data can be generated for further training one or more trained machine learning models to continue to provide the keyboard interface in that other context.

Figure 4:
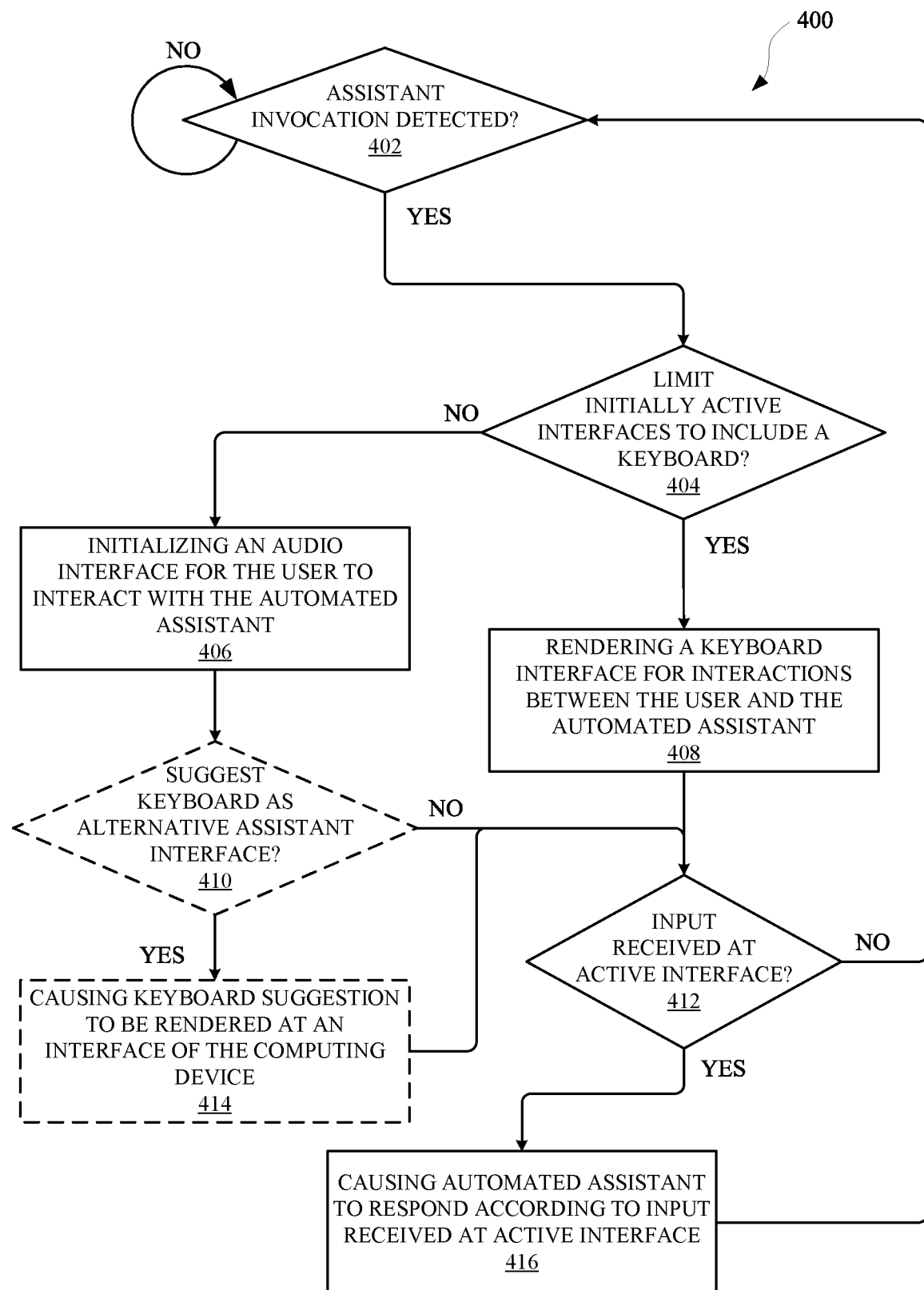
FIG. 4 illustrates a method operating an automated assistant that, in response to being invoked, can proactively predict and/or suggest an interface that a user may interact with in a certain context in order to more effectively engage with the automated assistant.

FIG. 4 illustrates a method 400 operating an automated assistant that, in response to being invoked, can proactively predict and/or suggest an interface that a user may interact with in a certain context in order to engage with the automated assistant. The method 400 can be performed by one or more devices, applications, and/or any other apparatus or module capable of controlling an automated assistant. The method 400 can include an operation 402 of determining whether an assistant invocation has been detected. An assistant invocation can be an input to an automated assistant that causes the automated assistant to be initialized for detecting further input from a user. For example, a button of a computing device can be programmed to invoke the automated assistant upon selection of the button by the user. Alternatively, or additionally, the automated assistant can be invoked in response to an invocation phrase (e.g., "Assistant"), which can be a word or phrase that, when spoken by a user, causes the automated assistant to operate to detect further input from the user. When an invocation input is detected, the method 400 can proceed from operation 402 to an operation 404. Otherwise, the automated assistant and/or computing device can continue to detect an assistant invocation input from a user.

The operation 404 can include determining whether to limit certain interfaces from being initialized in response to the invocation input. In other words, the automated assistant can determine whether, in response to the invocation input, to initialize other interfaces of the computing device besides a keyboard interface and/or other non-audio input (e.g., a GUI rendering of a keyboard). In some implementations, the operation 404 can be determined based on interaction data that characterizes prior interactions between the user and one or more computing devices, and/or one or more other users and/or one or more other computing devices. The interaction data can indicate features of various contexts in which users engage with certain interfaces in order to interact with a respective automated assistant. For example, the interaction data can indicate that on certain public walkways, a user is more likely to prefer to interact with their automated assistant via a keyboard interface over an audio interface. Alternatively, or additionally, the interaction data can indicate that, when a user is at their home or in their vehicle, the user is more likely to prefer to interact with their automated assistant via an audio interface over a keyboard interface.

When the automated assistant determines to not limit active assistant interfaces to a keyboard interface or other non-audio interface, the method 400 can proceed to an operation 406. The operation 406 can include initializing an audio interface for the user to interact with the automated assistant. The audio interface can include one or more microphones that can be used to detect spoken input from the user to the automated assistant. In some implementations, the automated assistant can cause a GUI element to be rendered at a display interface of the computing device in order to indicate that the audio interface is active.

The method 400 can proceed from the operation 406 to an optional operation 410, which can include determining whether to suggest a keyboard as an alternative assistant interface. In other words, the automated assistant can determine whether to render a suggestion to the user regarding a separate assistant interface that may be more effective and/or more suitable for communicating with the automated assistant than the audio interface. In some implementations, this determination can be based on the interaction data used for the determination at operation 404 and/or other data that can indicate features of a context of the user. In this way, the automated assistant can adapt according to changes in circumstances of the user and/or offer a variety of different interface arrangements according to the circumstances of the user. When the automated assistant determines to not suggest the keyboard as an alternative assistant interface, the method 400 can proceed to an operation 412. Otherwise, the method 400 can proceed to an optional operation 414.

The optional operation 414 can include causing a keyboard suggestion to be rendered at an interface of the computing device. The keyboard suggestion can include one or more selectable elements rendered at a display interface of the computing device to which the user provided the invocation input. For example, the keyboard suggestion can include a portion of an image of a keyboard and/or a portion of a natural language command (e.g., "Assistant, navigate to") that can be provided to the automated assistant via spoken utterance and/or textual input. When the keyboard suggestion is rendered at the interface of the computing device, the method 400 can proceed to the operation 412 for determining whether an assistant input has been received at any active input.

When, at the operation 404, the automated assistant decides to limit any initially active interfaces to include a keyboard, the method 400 can proceed to an operation 408. The operation 408 can include rendering a keyboard interface for receiving a subsequent input from the user and for the automated assistant. Under these circumstances, the keyboard interface can be provided in lieu of defaulting to initializing an audio interface for receiving spoken utterances from the user. This can prove to be more efficient, as this process can reduce an amount of processing that may otherwise occur if the user had to manually direct the automated assistant to initialize the keyboard interface for interactions that constantly defaulted to the audio interface.

The method 400 can proceed from the operation 408 to the operation 412 for determining whether an input has been received at an interface that is available for receiving assistant inputs. When an input is received, the method 400 can proceed to an operation 416 for causing the automated assistant to respond according to the input received at the active interface. Otherwise, when no input is received for a duration of time, the method 400 can return to the operation 402.

Figure 5:
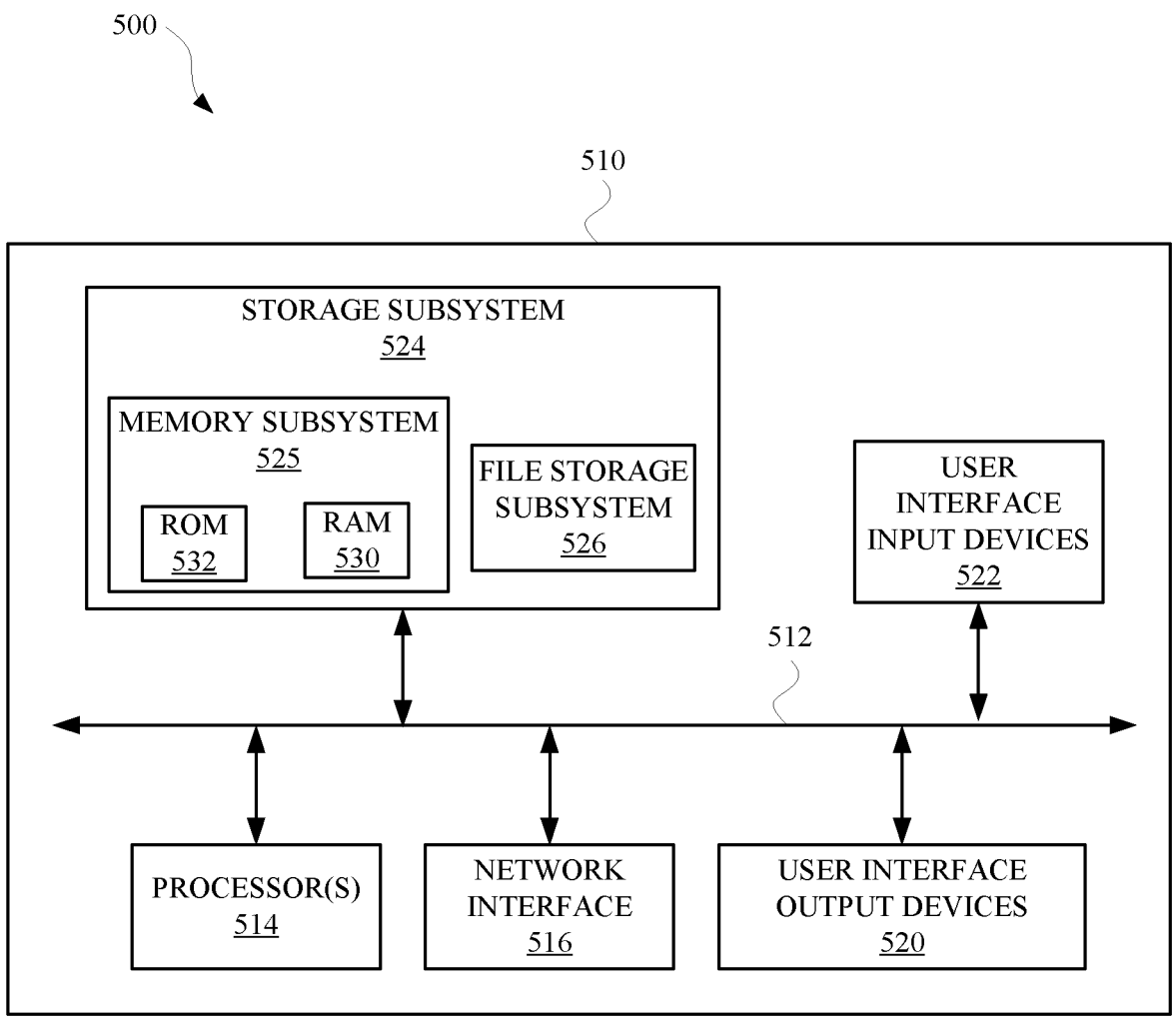
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, button, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, and/or any other application, device, apparatus, and/or module discussed herein.

These software modules are generally executed by processor 514 alone or in combination with other processors.

Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a computing device, a user input for invoking an automated assistant that is accessible via the computing device, wherein the automated assistant is responsive to audio interface input and keyboard interface input from a user via the computing device. The method can further include an operation of determining, by the automated assistant, whether to render the keyboard interface at a display interface of the computing device in response to the user input, wherein determining whether to render the keyboard interface in response to the user input is based on one or more prior interactions between one or more users and one or more computing devices. The method can further include an operation of, when the automated assistant determines to not render the keyboard interface at the display interface of the computing device: causing, in response to the user input, the audio interface of the computing device or another computing device to be initialized for receiving a spoken utterance from the user.

In some implementations, determining whether to render the keyboard interface at the display interface of the computing device in response to the user input includes: identifying a foreground application being rendered at the display interface of the computing device, and determining whether a prior interaction between the user and the foreground application involved an interface selected from a group of interfaces comprising the keyboard interface and the audio interface, wherein the automated assistant determines to render the keyboard interface at the display interface of the computing device when the user accessed the keyboard interface during the prior interaction. In some implementations, determining whether to render the keyboard interface at the display interface of the computing device in response to the user input includes: identifying a foreground application being rendered at the display interface of the computing device, and determining whether prior interactions between the user and the foreground application involved an interface selected from a group of interfaces comprising the keyboard interface and the audio interface, wherein the automated assistant determines to render a keyboard shortcut or a portion of the keyboard interface at the display interface of the computing device when the keyboard interface and the audio interface were used during the prior interactions.

In some implementations, determining whether to render the keyboard interface at the display interface of the computing device in response to the user input includes: identifying a current state of a foreground application being rendered at the display interface of the computing device, and determining whether the user previously accessed, during a prior interaction with the foreground application, an interface selected from a group of interfaces comprising the keyboard interface and the audio interface, wherein, during the prior interaction, the foreground application was operating in a state corresponding to the current state. In some implementations, the method can further include an operation of, when the automated assistant determines to not render the keyboard interface at the display interface of the computing device: determining whether to render, at the display interface, a selectable element that, when selected, causes the keyboard interface to be rendered at the display interface. In some implementations, determining whether to render the selectable element at the display interface includes: determining whether a metric satisfies a particular threshold, wherein the metric is based on a number of instances in which the user accessed the keyboard interface while the foreground application was operating in the state, and wherein the automated assistant causes the selectable element to be rendered when the metric does not satisfy the particular threshold.

In some implementations, the selectable element includes an assistant input suggestion and, when the selectable element is selected, the assistant input suggestion is rendered as a portion of a draft input that can be edited using the keyboard interface. In some implementations, the foreground application is an internet browser application and the current state of the foreground application is based on a website that is being rendered at the foreground application. In some implementations, the method can further include an operation of, when the automated assistant determines to render the keyboard interface at the display interface of the computing device: causing, in response to the user input, the computing device to render a haptic output. In some implementations, determining whether to render the keyboard interface at the display interface of the computing device in response to the user input includes: determining a location of the user when the user provides the user input for invoking the automated assistant, and determining whether a prior interaction, at the location, between the user and the computing device involved an interface selected from a group comprising the keyboard interface and the audio interface, wherein the automated assistant determines to render the keyboard interface at the display interface of the computing device when the user is determined to have accessed the keyboard interface during the prior interaction.

In some implementations, determining whether to render the keyboard interface at the display interface of the computing device in response to the user input includes: processing interaction data using one or more trained machine learning models, wherein the interaction data is based on the one or more prior interactions, and wherein the one or more trained machine learning models are trained using training data that is based on one or more other prior interactions between the user and the computing device. In some implementations, determining whether to render the keyboard interface at the display interface of the computing device in response to the user input includes: processing interaction data using one or more trained machine learning models, wherein the interaction data is based on the one or more prior interactions between the user and the computing device, and wherein the one or more trained machine learning models are trained using training data that is based one or more other prior interactions between others users and other computing devices.

In yet other implementations, a method implemented by one or more processors is set forth as including operations such as receiving, at a computing device, a user input for invoking an automated assistant that is accessible via the computing device, wherein the computing device includes a first input modality and a second input modality, and the user input is received at the first input modality. The method can further include an operation of determining, by the automated assistant, whether to cause the computing device to render an indication that the second input modality is active for receiving separate input from the user. The method can further include an operation of, when the automated assistant determines to not render the indication that the second input modality is active for receiving the separate input from the user: causing, in response to the user input, the computing device to render a separate indication that the first input modality is active for receiving additional input from the user, wherein the automated assistant can receive the additional input via direct physical contact at the first input modality.

In some implementations, the method can further include an operation of, when the automated assistant determines to render the indication that the second input modality is active for receiving the further input from the user: causing, in response to the user input, the computing device to render the indication that the second input modality is active for receiving the separate input from the user, wherein the automated assistant can receive the separate input via indirect physical input to the second input modality. In some implementations, the direct physical contact includes a touch input performed using an extremity of a user, and wherein the indirect physical input includes a non-touch input performed, by the user, via a physical motion that occurs at a non-zero distance from the computing device.

In yet other implementations, a method implemented by one or more processors is set forth as including operations such as receiving, at a computing device, a user input for invoking an automated assistant that is accessible via the computing device, wherein the computing device includes a first input modality and a second input modality that is different than the first input modality. The method can further include an operation of processing interaction data that indicates a frequency in which a user employs the first input modality of the computing device for providing input to the automated assistant in a particular circumstance. The method can further include an operation of determining, based on the interaction data, whether the frequency satisfies one or more thresholds for indicating that one or more particular input modalities are available for receiving further inputs from the user. The method can further include an operation of, when the frequency satisfies a threshold, of the one or more thresholds, for indicating that the first input modality is available for receiving further inputs from the user: causing the computing device to render a graphical user interface (GUI) element that corresponds to the first input modality.

In some implementations, the method can further include an operation of, when the frequency satisfies a different threshold, of the one or more thresholds, for indicating that the first input modality and the second input modality are available for receiving additional inputs from the user: causing the computing device to concurrently render the GUI element and an additional GUI element, wherein the additional GUI element corresponds to the second input modality. In some implementations, causing the computing device to concurrently render the GUI element and the additional GUI element includes: causing the GUI element to be rendered as a portion of a keyboard that can receive the further inputs from the user to the automated assistant. In some implementations, the additional GUI element indicates that an audio interface of the computing device has been initialized in response to the user input. In some implementations, the particular circumstance includes a circumstance in which a particular application is being rendered at a foreground of a display interface of the computing device.

We claim:

1. A method implemented by one or more processors, the method comprising:
   receiving, at a computing device, a user input for invoking an automated assistant that is accessible via the computing device,
      wherein the automated assistant is responsive to audio interface input and keyboard interface input from a user via the computing device;
   determining, by the automated assistant, whether to render the keyboard interface at a display interface of the computing device in response to the user input,
      wherein determining whether to render the keyboard interface in response to the user input is based on one or more prior interactions between one or more users and one or more computing devices, and includes:
         identifying a current state of a foreground application being rendered at the display interface of the computing device, and
         determining whether the user previously accessed, during a prior interaction with the foreground application, an interface selected from a group of interfaces comprising the keyboard interface and the audio interface,
            wherein, during the prior interaction, the foreground application was operating in a state corresponding to the current state; and
   when the automated assistant determines to not render the keyboard interface at the display interface of the computing device:
      causing, in response to the user input, the audio interface of the computing device or another computing device to be initialized for receiving a spoken utterance from the user;
      determining whether to render, at the display interface, a selectable element that, when selected, causes the keyboard interface to be rendered at the display interface; and
      in response to determining to render the selectable element:
         rendering the selectable element.

2. The method of claim 1,
   wherein the automated assistant determines to render the keyboard interface at the display interface of the computing device when the user accessed the keyboard interface during the prior interaction.

3. The method of claim 1,
   wherein the automated assistant determines to render a portion of the keyboard interface at the display interface of the computing device when the keyboard interface and the audio interface were used during the prior interactions.

4. The method of claim 1, wherein determining whether to render the selectable element at the display interface includes:
   determining whether a metric satisfies a particular threshold,
      wherein the metric is based on a number of instances in which the user accessed the keyboard interface while the foreground application was operating in the state, and
      wherein the automated assistant causes the selectable element to be rendered when the metric does not satisfy the particular threshold.

5. The method of claim 4, wherein the selectable element includes an assistant input suggestion and, when the selectable element is selected, the assistant input suggestion is rendered as a portion of a draft input that can be edited using the keyboard interface.

6. The method of claim 1, wherein the foreground application is an internet browser application and the current state of the foreground application is based on a website that is being rendered at the foreground application.

7. The method of claim 1, further comprising:
when the automated assistant determines to render the keyboard interface at the display interface of the computing device:
causing, in response to the user input, the computing device to render a haptic output.

8. The method of claim 1, wherein determining whether to render the keyboard interface at the display interface of the computing device in response to the user input includes:
determining a location of the user when the user provides the user input for invoking the automated assistant, and
determining whether a prior location interaction, at the location, between the user and the computing device involved the interface,
wherein the automated assistant determines to render the keyboard interface at the display interface of the computing device when the user is determined to have accessed the keyboard interface during the prior location interaction.

9. The method of claim 1, wherein determining whether to render the keyboard interface at the display interface of the computing device in response to the user input includes:
processing interaction data using one or more trained machine learning models,
wherein the interaction data is based on the one or more prior interactions, and
wherein the one or more trained machine learning models are trained using training data that is based on one or more other prior interactions between the user and the computing device.

10. The method of claim 1, wherein determining whether to render the keyboard interface at the display interface of the computing device in response to the user input includes:
processing interaction data using one or more trained machine learning models, wherein the interaction data is based on the one or more prior interactions between the user and the computing device, and
wherein the one or more trained machine learning models are trained using training data that is based on one or more other prior interactions between others users and other computing devices.

11. A method implemented by one or more processors, the method comprising:
receiving, at a computing device, a user input for invoking an automated assistant that is accessible via the computing device,
wherein the computing device includes a first input modality and a second input modality that is different than the first input modality;
processing interaction data that indicates a frequency in which a user employs the first input modality of the computing device for providing input to the automated assistant in a particular circumstance;
determining, based on the interaction data, whether the frequency satisfies one or more thresholds for indicating that one or more particular input modalities are available for receiving further inputs from the user; and
when the frequency satisfies a threshold, of the one or more thresholds, for indicating that the first input modality is available for receiving further inputs from the user:
causing the computing device to render a graphical user interface (GUI) element that corresponds to the first input modality; and
when the frequency satisfies a different threshold, of the one or more thresholds, for indicating that the first input modality and the second input modality are available for receiving additional inputs from the user:
causing the computing device to concurrently render an additional GUI element that corresponds to the second input modality.

12. The method of claim 11, wherein causing the computing device to concurrently render the GUI element and the additional GUI element includes:
causing the GUI element to be rendered as a portion of a keyboard that can receive the further inputs from the user to the automated assistant.

13. The method of claim 12, wherein the additional GUI element indicates that an audio interface of the computing device has been initialized in response to the user input.

14. The method of claim 11, wherein the particular circumstance includes a circumstance in which a particular application is being rendered at a foreground of a display interface of the computing device.

* * * * *